US006902474B2

(12) United States Patent
Gehring et al.

(10) Patent No.: US 6,902,474 B2
(45) Date of Patent: Jun. 7, 2005

(54) AIR DUCT OUTLET WITH SINGLE VANE AIR STREAM DIRECTION CONTROL

(75) Inventors: Thomas F. J. Gehring, Ontario (CA); Ireneusz Jankowski, Ontario (CA); Dejan Havidic, Toronto (CA); Douglas Lim Hester, Scarborough (CA); Peter Dominic Lewis, Etobicoke (CA)

(73) Assignee: Collins & Aikman Products Co., Troy, MI (US)

( * ) Notice: Subject to any disclaimer, the term of this patent is extended or adjusted under 35 U.S.C. 154(b) by 64 days.

(21) Appl. No.: 10/465,362

(22) Filed: Jun. 19, 2003

(65) Prior Publication Data

US 2004/0152411 A1 Aug. 5, 2004

Related U.S. Application Data

(60) Provisional application No. 60/443,952, filed on Jan. 31, 2003.

(51) Int. Cl.[7] .................................................. B60H 1/34
(52) U.S. Cl. ..................... 454/153; 454/152; 454/155
(58) Field of Search ..................... 454/152, 155, 454/906, 262

(56) References Cited

U.S. PATENT DOCUMENTS

| | | | |
|---|---|---|---|
| 1,428,882 A | 9/1922 | Dyer | |
| 2,135,810 A | 11/1938 | Germonprez | 98/110 |
| 2,395,319 A | 2/1946 | Davies | 98/110 |
| 2,759,410 A | 8/1956 | Hurt, Jr. | 98/40 |
| 2,987,981 A | 6/1961 | Boylan | 98/2 |
| 3,456,574 A | 7/1969 | Jakeway | 98/121 |
| 3,552,295 A | 1/1971 | Armstrong | 98/110 |
| 3,701,311 A | 10/1972 | McLarty | 98/110 |
| 3,832,939 A | 9/1974 | Kakei et al. | 98/2.09 |
| 3,952,639 A | 4/1976 | Nobata | 98/110 |
| 4,006,673 A | 2/1977 | Meyer et al. | 98/40 |
| 4,060,024 A | 11/1977 | Deck | 98/40 |
| 4,345,510 A | 8/1982 | Sterett | 98/40 |
| 4,534,277 A | 8/1985 | Gillmor | 98/36 |
| 4,570,533 A * | 2/1986 | Sugawara et al. | 454/319 |
| 4,621,570 A | 11/1986 | Bolton et al. | 98/114 |
| 4,646,625 A | 3/1987 | Schroeder | 98/1 |
| 4,702,156 A | 10/1987 | Sano | 98/40.24 |
| 4,928,582 A | 5/1990 | Elfverson | 98/2 |
| 4,938,122 A | 7/1990 | Ziemba | 98/2 |
| 5,036,753 A | 8/1991 | Ostrand et al. | 98/2 |
| 5,230,655 A | 7/1993 | Thompson et al. | 454/202 |
| 5,259,815 A | 11/1993 | Stouffer et al. | 454/125 |

(Continued)

Primary Examiner—Derek S. Boles
(74) Attorney, Agent, or Firm—Myers Bigel Sibley & Sajovec, P.A.

(57) ABSTRACT

An air duct outlet that allows a user to redirect an air stream within a wide range of directions includes a housing having a planar first wall and a convexly-curved second wall in adjacent, spaced-apart relationship and that define an air passageway having an inlet and a flared outlet. A vane is pivotally attached within the air passageway and is movable within a range of positions that are increasingly transverse to the first wall. An air stream flowing through the air passageway is deflected by an amount that increases with each position of the vane in the range such that the air stream adheres to a portion of the second wall by an amount that increases with each position of the vane in the range and such that the air stream exits from the outlet in a direction that is increasingly transverse to a direction normal to the outlet.

26 Claims, 6 Drawing Sheets

U.S. PATENT DOCUMENTS

| | | |
|---|---|---|
| 5,338,252 A | 8/1994 | Bowler et al. ............... 454/155 |
| 5,480,350 A | 1/1996 | Naruse ....................... 454/155 |
| 5,569,076 A | 10/1996 | Sudak et al. ................ 454/155 |
| 5,690,550 A | 11/1997 | Mikowski ................... 454/155 |
| 5,741,179 A | 4/1998 | Sun et al. ................... 454/155 |
| 5,746,651 A | 5/1998 | Arajs et al. ................. 454/154 |
| 5,752,877 A | 5/1998 | Sun ............................ 454/155 |
| 5,938,527 A | 8/1999 | Oshima et al. ............. 454/344 |
| 5,947,813 A | 9/1999 | Chow et al. ................. 454/155 |
| 6,059,652 A | 5/2000 | Terry et al. ................. 454/155 |
| 6,059,653 A | 5/2000 | Gehring et al. ............. 454/155 |
| 6,129,627 A | 10/2000 | Jankowski et al. ......... 454/155 |
| 6,159,092 A | 12/2000 | Elder .......................... 454/155 |
| 6,386,965 B1 | 5/2002 | Greenwald et al. ........... 454/75 |
| 6,435,962 B1 | 8/2002 | Herron et al. ............... 454/290 |
| 6,582,294 B2 | 6/2003 | Butera et al. ............... 454/155 |

\* cited by examiner

AIR DUCT OUTLET WITH SINGLE VANE AIR STREAM DIRECTION CONTROL

RELATED APPLICATION

This application claims the benefit of U.S. Provisional Application No. 60/443,952 filed Jan. 31, 2003, the disclosure of which is incorporated herein by reference in its entirety as if set forth fully herein.

FIELD OF THE INVENTION

The present invention relates generally to vehicles and, more particularly, to air duct outlets utilized within vehicles.

BACKGROUND OF THE INVENTION

Conventionally, vehicle interiors are provided with one or more air duct outlets which are connected by ducts to an outside air source and/or to a heating and/or air conditioning system that provides cooled and/or heated air. Because it is generally desirable for vehicle occupants to be able to adjust the direction of air flow within a vehicle interior, air duct outlets are typically provided with adjustable vanes or louvers. In addition, air duct outlets may be provided with dampers for allowing vehicle occupants to control the amount of air flowing therethrough.

Conventional air duct outlets utilize one or more sets of louvers to mechanically redirect air streams. While this technology is proven and successful, the louver assemblies can be complex and expensive to manufacture. In addition, conventional air duct outlets typically provide an air stream deflection range up to only about 90° (i.e., −45° to +45° relative to a centerline of the air duct outlet). Deflection ranges in excess of ±45° typically result in large pressure drops and lower air flow rates, which are undesirable. In addition, vehicle manufacturers are continuously seeking components, such as air duct outlets, that have enhanced functionality and durability, yet are cost effective to manufacture.

SUMMARY OF THE INVENTION

In view of the above discussion, air duct outlets that allow users to redirect air streams within a wide range of directions and without causing large pressure drops and reduced flow rates are provided. According to embodiments of the present invention, an air duct outlet includes a housing having a planar first wall and a convexly-curved second wall that are in adjacent, spaced-apart relationship and that define an air passageway having an inlet and a flared outlet. A vane is pivotally attached within the air passageway and is movable within a range of positions that are increasingly transverse to the first wall. An air stream flowing through the air passageway is deflected by an amount that increases with each position of the vane in the range such that the air stream adheres to a portion of the second wall via the Coanda effect by an amount that increases with each position of the vane in the range and such that the air stream exits from the outlet in a direction that is increasingly transverse to a direction normal to the outlet.

According to another embodiment of the present invention, an air duct outlet includes a housing having first and second convexly-curved walls that are in adjacent, spaced-apart relationship and that define an air passageway having an inlet and a flared outlet. A vane is pivotally attached within the air passageway and is movable within a range of positions that are increasingly transverse to the first wall. An air stream flowing through the air passageway is deflected by an amount that increases with each increasingly transverse position of the vane in the range such that the air stream adheres via the Coanda effect to less of a portion of the first wall and more of a portion of the second wall with each increasingly transverse position of the vane in the range. Accordingly, an air stream can exit from the outlet within a range of between about −45° and about +90° relative to a direction normal to the outlet.

According to another embodiment of the present invention, air distribution systems for vehicle passenger compartments include an instrument panel having a convexly-curved portion and an opening formed therein in spaced-apart relationship with the convexly-curved portion. An air duct outlet having one or more convexly-curved walls as described above is disposed within the instrument panel opening. Movement of a vane within an air passageway of the air duct outlet to a fully deflected position causes an air stream flowing through the air passageway to adhere via the Coanda effect to a convexly-curved wall of the air duct outlet and to a surface of the instrument panel. The air stream follows the instrument panel surface to the instrument panel convexly-curved portion. The air stream adheres to the convexly-curved portion of the instrument panel and is directed to a remote location of the vehicle passenger compartment.

Air duct outlets according to embodiments of the present invention allow for improved air flow directability including greatly increased ranges of directability. Moreover, air duct outlets according to embodiments of the present invention can facilitate new and improved styling opportunities for vehicle manufacturers and other manufacturers. Air duct outlets according to embodiments of the present invention are not limited to uses within vehicles (e.g., automobiles, trucks, boats, aircraft, etc.), but may also be utilized in residential and commercial heating, ventilating and air conditioning (HVAC) applications.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring to FIGS. 1–6, an air duct outlet 10, according to embodiments of the present invention, is illustrated. The illustrated air duct outlet 10 is designed for use within the interior compartments of vehicles, such as automobiles, trucks, trains, boats, aircraft, and the like. However, it is understood that air duct outlets according to embodiments of the present invention may be utilized in various environments (e.g., in homes and offices) and are not limited only to use in vehicles.

Figure 1:
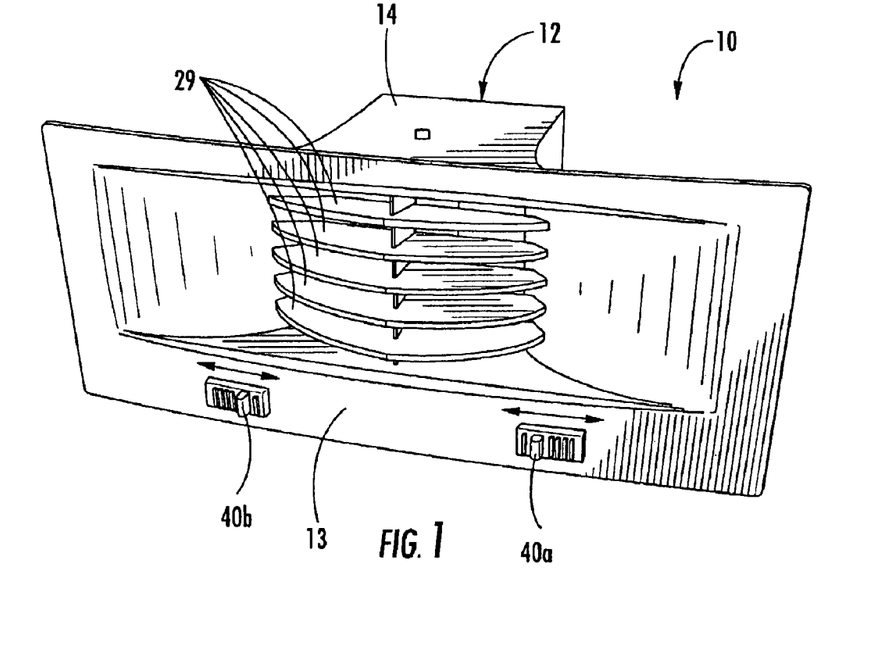
FIG. 1 is a front, perspective view of an air duct outlet, according to embodiments of the present invention.
Figure 2:
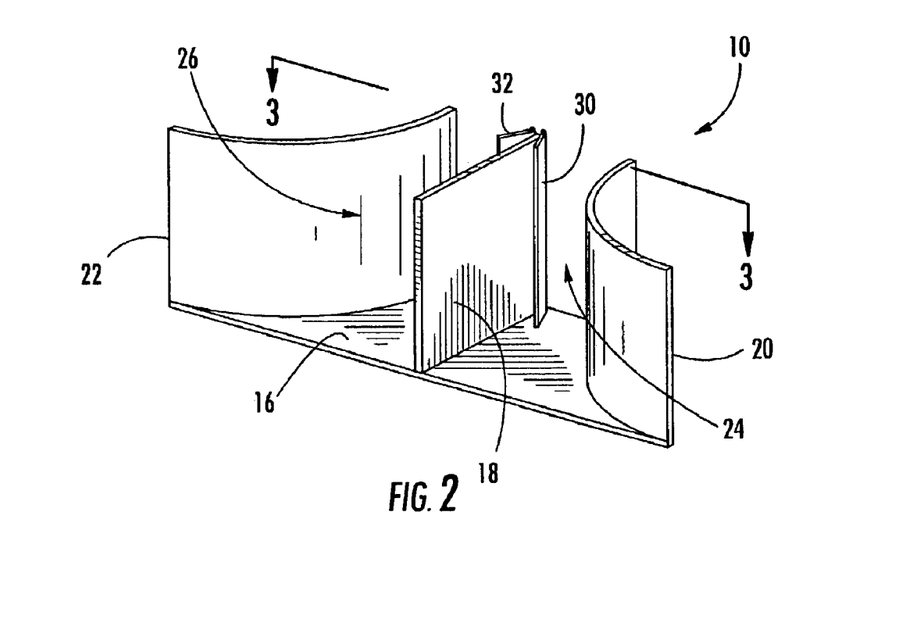
FIG. 2 is a partial perspective view of the air duct outlet of FIG. 1 with the central planar wall and convexly-curved walls illustrated.
Figure 3:
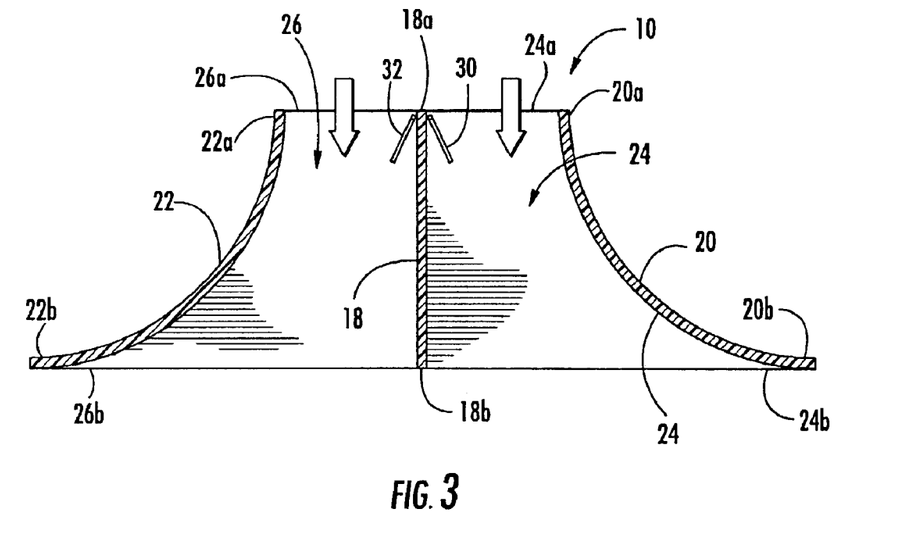
FIG. 3 is a top view of FIG. 2, taken along lines 3—3.

Referring initially to FIGS. 1–3, the illustrated air duct outlet 10 includes a housing 12 having a front panel 13, a top wall 14, a bottom wall 16, a central wall 18 and a pair of convexly-curved walls 20, 22, each positioned on a respective side of the central wall 18. The illustrated central wall 18 has a generally planar configuration, but can have various shapes and configurations. Central wall 18 and convexly-curved wall 20 are in adjacent, spaced-apart relationship and define a first air passageway 24 having an inlet 24a and a flared outlet 24b, as illustrated. Similarly, central wall 18 and convexly-curved wall 22 are in adjacent, spaced-apart relationship and define a second air passageway 26 having an inlet 26a and a flared outlet 26b, as illustrated. As would be understood by those skilled in the art, the housing 12 is configured to be connected to a source of air flow, such as a fan, that supplies heated and/or cooled air (as well as ambient outside air) to the first and second air passageways 24, 26.

The illustrated air duct outlet 10 includes a plurality of fixed, generally horizontal louvers 29 that extend between convexly-curved walls 20, 22. Embodiments of the present invention may have various numbers and configurations of fixed louvers and are not limited to the illustrated louvers 29. Moreover, embodiments of the present invention do not require any louvers other than a single vane within a respective air passageway as described herein. An air duct outlet according to embodiments of the present invention can have various sizes and shapes.

In the illustrated embodiment, respective end portions 18a, 20a of the central wall 18 and convexly-curved wall 20 at the first air passageway inlet 24a are substantially parallel (i.e., they generally extend along directions that are substantially parallel), and respective end portions 18b, 20b of the central wall 18 and convexly-curved wall 20 at the first air passageway outlet 24b are substantially orthogonal (i.e.,  they generally extend along directions that are substantially perpendicular). Similarly, respective end portions 18a, 22a of the central wall 18 and convexly-curved wall 22 at the second air passageway inlet 26a are substantially parallel, and respective end portions 18b, 22b of the central wall 18 and convexly-curved wall 22 at the second air passageway outlet 26b are substantially orthogonal.

A first vane 30 is pivotally attached within the first air passageway 24 adjacent the first air passageway inlet 24a and is movable within a range of positions that are increasingly transverse to the first wall 18. Similarly, a second vane 32 is pivotally attached within the second air passageway 26 adjacent the second air passageway inlet 26a and is movable within a range of positions that are increasingly transverse to the first wall 18. Vanes 30, 32 may be pivotally attached within the respective air passageways 24, 26 in various ways (e.g., via pivot pins, hinges, etc.). Moreover, vanes 30, 32 may be pivotally attached to the central wall 18 and/or to the top and/or bottom walls 14, 16 of the housing.

Air duct outlets according to embodiments of the present invention may be formed from various materials, without limitation. For example, the various components of the illustrated air duct outlet 10 may be formed, for example, from one or more types of polymeric materials, metals, wood, and/or combinations thereof.

Figure 4:
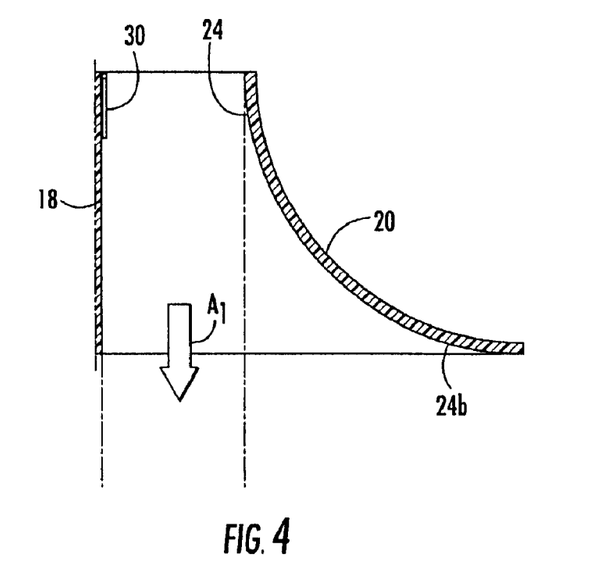
FIGS. 4–6 illustrate movement of the first vane in the first air passageway of the air duct outlet of FIG. 3 and the corresponding changes in air flow direction.
Figure 5:
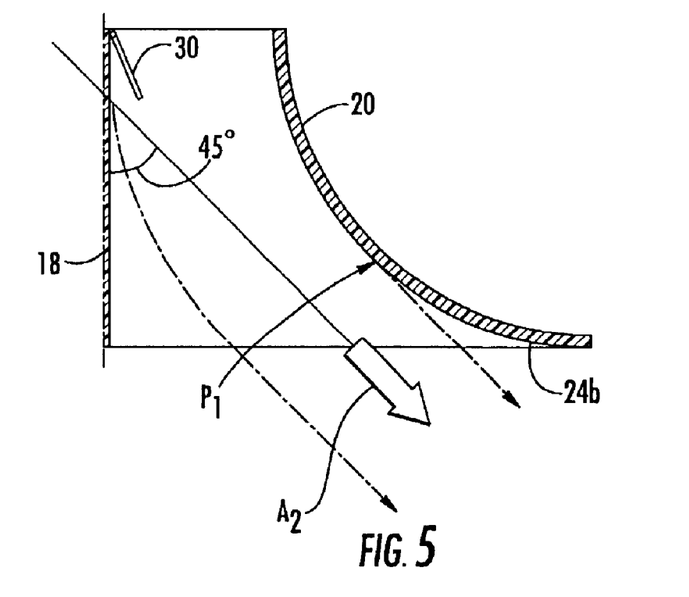
Figure 6:
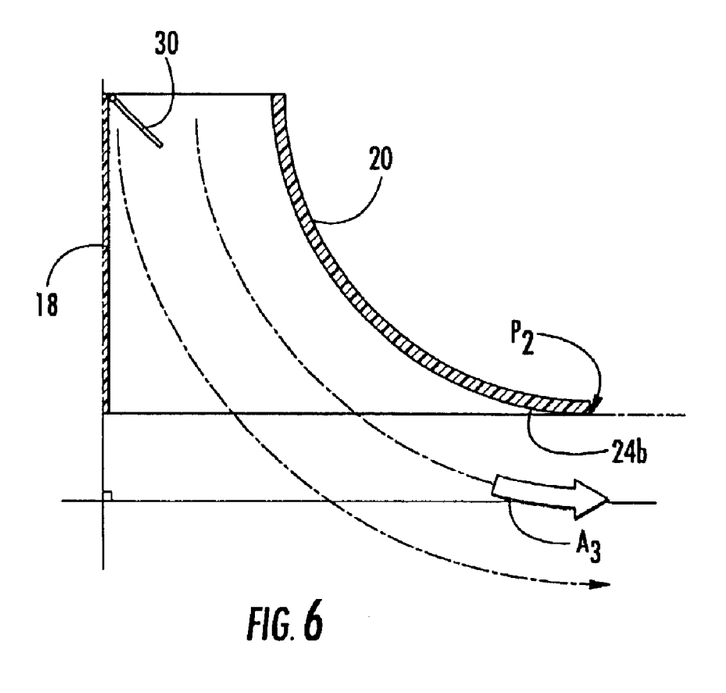

Operation of the first and second vanes 30, 32 to control the direction of air streams exiting from the respective first and second air passageways 24, 26 is identical. Accordingly, operation of only the first vane 30 is illustrated in FIGS. 4–6 and described below.

In a first position (FIG. 4), the first vane 30 is disposed in face-to-face adjacent relationship with the central wall 18. In this position, an air stream flowing through the first air passageway 24 is not deflected by the first vane 30 and the air stream exits from the outlet 24b in a direction $A_1$ that is substantially normal to the first air passageway outlet 24b (i.e., substantially parallel with the illustrated central wall 18). As the first vane 30 is pivoted from the first position (FIG. 4), an air stream flowing through the first air passageway 24 is deflected by an amount that increases with each position of the first vane 30 in the range. The air stream adheres to a portion of the convexly-curved wall 20 via a phenomenon known as the "Coanda effect" and by an amount that increases with each amount by which the air stream is deflected by the first vane 30.

As known to those skilled in the art, the Coanda effect is the tendency for a moving fluid (either liquid or gas) to attach itself to a surface and flow along the surface. As a fluid moves across a surface a certain amount of friction occurs between the surface and the fluid, which tends to slow down the fluid as it moves across the surface. This resistance to flow tends to pull the fluid towards the surface, making it adhere to the surface, even as it bends around corners.

The more the air stream adheres to the convexly-curved wall 20, the greater the angle the exiting air stream has relative to the central wall 18. For example, in FIG. 5, the first vane 30 is moved partially within its range of movement. At the illustrated position, the air stream adheres to the convexly-curved wall 20 up until location $P_1$ resulting in the air stream exiting from the outlet 24b in a direction $A_2$ that is transverse to the central wall 18. In the illustrated embodiment, $A_2$ is at an angle of about 45° relative to the central planar wall 18. In FIG. 6, the first vane 30 is moved further within its range of movement. At the illustrated position, the air stream adheres to the convexly-curved wall 20 up until location P₂ resulting in the air stream exiting from the outlet 24b in a direction A₃ that is substantially orthogonal (e.g., about 90°) to the central wall 18.

Accordingly, an air stream flowing through the first air passageway 24 exits from the outlet 24b in a direction that is increasingly transverse to a direction normal to the outlet 24b as the first vane 30 is moved along its range of movement. Similarly, an air stream flowing through the second air passageway 26 would exit from the outlet 26b in a direction that is increasingly transverse to a direction normal to the outlet 26b as the second vane 34 is moved along its range of movement.

In the illustrated embodiment, each vane 30, 32 is movable within a range of positions that can cause an air stream to have an exit direction from the respective first and second air passageway outlets 24b, 26b of between about 0° and about 90° relative to a direction normal to each respective outlet. Moreover, because there are no movable louvers to reduce the effective areas of the outlets 24b, 26b (as with conventional air duct outlets), large pressure drops and reduced air flow rates are avoided, even when an air stream exits at a 90° angle.

Referring back to FIG. 1, a pair of actuators 40a, 40b extend from the housing front panel 13 and are each operably coupled with a respective one of the first and second vanes 30, 32. Accordingly, a user desiring to adjust the direction of an air stream exiting from the first air passageway outlet 24b moves actuator 40a which, in turn, moves the first vane 30 between positions in its respective range. Similarly, a user desiring to adjust the direction of an air stream exiting from the second air passageway outlet 26b moves actuator 40b which, in turn, moves the second vane 32 between positions in its respective range. Each actuator 40a, 40b may be mechanically linked with a respective vane 30, 32. Various ways of mechanically linking each actuator 40a, 40b with a respective vane 30, 32 may be utilized and would be understood by those skilled in the art. These may include, but are not limited to, mechanical linkages, cables, pneumatic and hydraulic mechanisms, etc.

Figure 7:
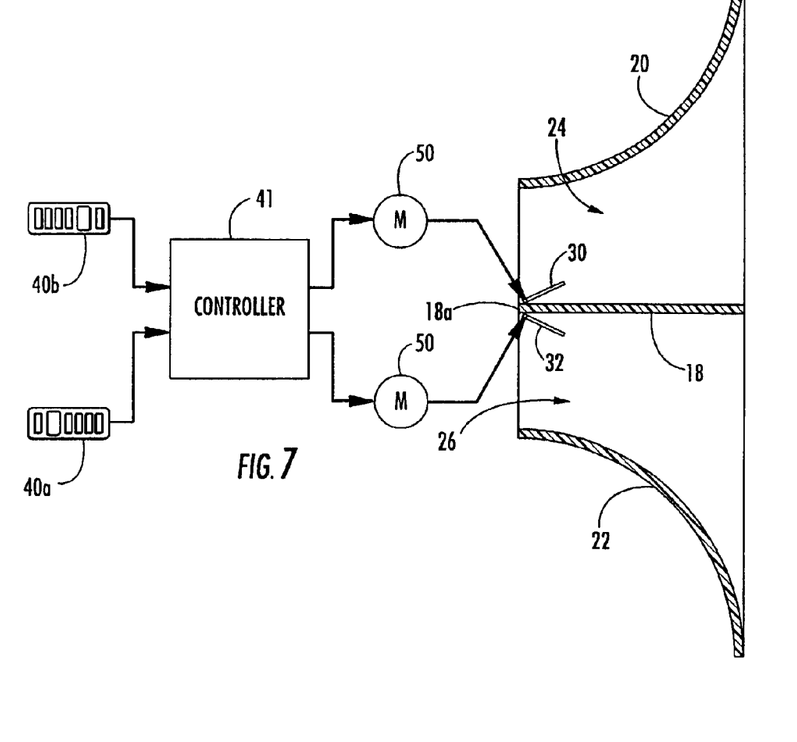
FIG. 7 is a block diagram illustrating an air duct outlet according to other embodiments of the present invention.

According to an alternative embodiment of the present invention illustrated in FIG. 7, actuators 40a, 40b may be configured to produce output signals responsive to user movement thereof. For example, movement of an actuator 40a, 40b produces respective output signals to move a respective vane 30, 32 by a proportional amount. A respective servomotor 50 is operably coupled with each vane 30, 32. Each servomotor 50 is configured to cause pivotal movement of a respective vane 30, 32 in response to selected user movement of a respective actuator 40a, 40b. A servomotor is an electromechanical device in which an electrical input determines the position of the armature of a motor. Servomotors, including the control and use thereof, are well understood and need not be described further herein. Various types and sizes of servomotors may be utilized in accordance with embodiments of the present invention.

A controller 41 is in communication with each actuator 40a, 40b and with the servomotors 50. The controller is configured to receive output signals from the actuators 40a, 40b and convert them into respective commands for each respective servomotor 50. Accordingly, user manipulation of the actuators 40a, 40b is translated into pivotal movement of the vanes 30, 32 within the respective air passageways 24, 26.

Figure 8A:
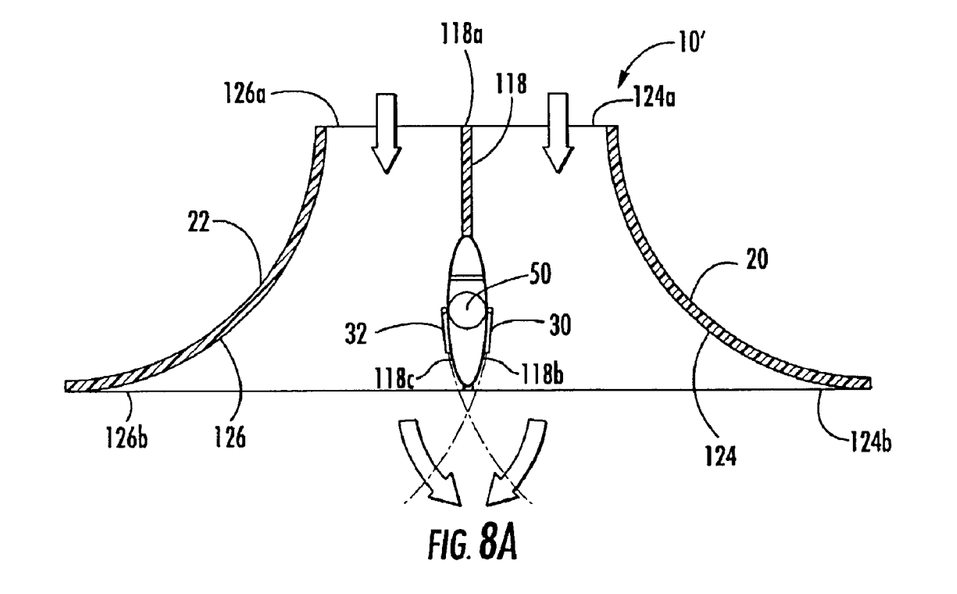
FIGS. 8A–8B are top section views of an air duct outlet illustrating a central wall having convexly-curved portions, according to other embodiments of the present invention.
Figure 8B:
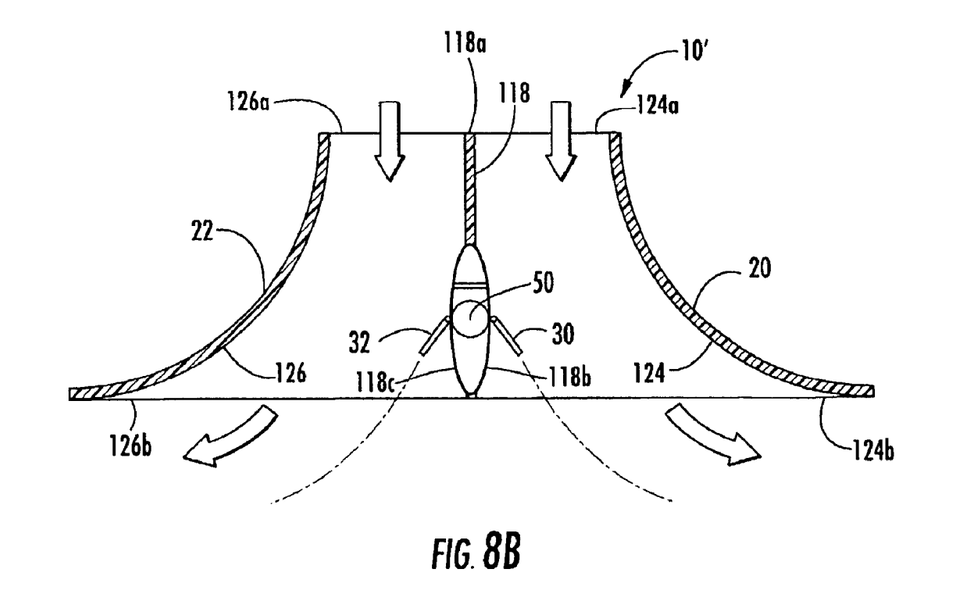

Referring now to FIGS. 8A–8B, an air duct outlet 10', according to other embodiments of the present invention, is illustrated. The illustrated air duct outlet 10' is similar in structure to the air duct outlet 10 described above, but permits a greater range of air stream directions by using a central wall having convexly-curved portions. In the illustrated embodiment, the air duct outlet 10' includes a central wall 118 and a pair of convexly-curved walls 20, 22, each positioned on a respective side of the planar wall 118. The central wall 118 has a portion 118a that has a generally planar configuration and convexly-curved portions 118b, 118c. Central wall 118 and convexly-curved wall 20 are in adjacent, spaced-apart relationship and define a first air passageway 124 having an inlet 124a and a flared outlet 124b, as illustrated. The flared outlet 124b of the air duct outlet 10' permits a greater range of air directability than the flared outlet 124b of the air duct outlet 10 of FIGS. 1–6 because of convexly-curved portion 118b. For example, an air stream exiting from air passageway 124 can have a range of directions between about −45° and about +90° relative to a direction normal to outlet 124b.

Similarly, central wall 118 and convexly-curved wall 22 are in adjacent, spaced-apart relationship and define a second air passageway 126 having an inlet 126a and a flared outlet 126b, as illustrated. The flared outlet 126b of the air duct outlet 10' permits a greater range of air directability than the flared outlet 26b of the air duct outlet 10 of FIGS. 1–6 because of convexly-curved portion 118c. For example, an air stream exiting from air passageway 126 can have a range of directions between about −45° and about +90° relative to a direction normal to outlet 126b.

A first vane 30 is pivotally attached within the first air passageway 124 adjacent the first air passageway inlet 124a and is movable within a range of positions that are increasingly transverse to wall 118. An air stream flowing through the first air passageway 124 is deflected by an amount that increases with each increasingly transverse position of the first vane 30 in the range such that the air stream adheres to less of a portion of the central wall convexly-curved portion 118b and adheres to more of the convexly-curved wall 20 with each increasingly transverse position of the vane 30.

Similarly, a second vane 32 is pivotally attached within the second air passageway 126 adjacent the second air passageway inlet 126a and is movable within a range of positions that are increasingly transverse to wall 118. An air stream flowing through the second air passageway 126 is deflected by an amount that increases with each increasingly transverse position of the second vane 32 in the range such that the air stream adheres to less of a portion of the central wall convexly-curved portion 118c and adheres to more of the convexly-curved wall 22 with each increasingly transverse position of the vane 32.

The air duct outlet 10' of FIG. 8 may have respective vanes 30, 32 controlled via actuators as described above with respect to the embodiments of FIGS. 1–7. In addition, one or more servomotors 50 operably connected with vanes 30, 32 may be positioned within the central wall 118, as illustrated in FIG. 8.

Figure 9:
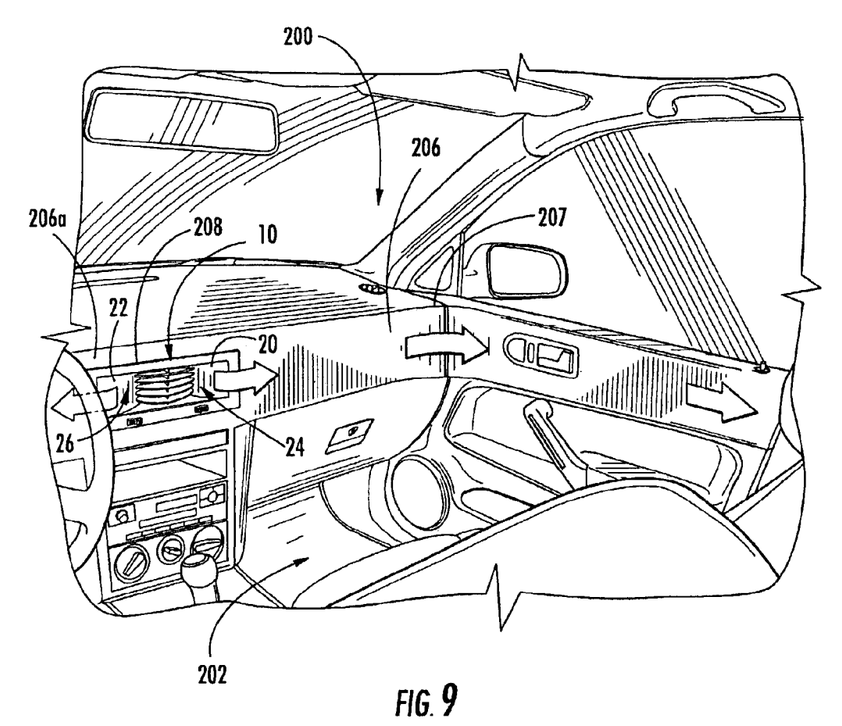
FIG. 9 is a perspective view of an air distribution system, according to embodiments of the present invention.

Referring now to FIG. 9, an air distribution system 200 for distributing air to remote locations of a vehicle passenger compartment 202, according to embodiments of the present invention, is illustrated. The air distribution system 200 includes an instrument panel 206 having a convexly-curved portion 207 and an opening 208 formed therein in spaced-apart relationship with the convexly-curved portion 207. An air duct outlet 10 as described with respect to FIGS. 1–6 is disposed within the instrument panel opening 208. Movement of the vane (not shown) within the air passageway 24 to a fully deflected position causes an air stream flowing through the air passageway 24 to adhere to the convexly-curved wall 20 and to the instrument panel surface 206a. The air stream follows the instrument panel surface 206a to the instrument panel convexly-curved portion 207. The air stream adheres to the convexly-curved portion 207 of the instrument panel 206 and is directed to a remote location of the vehicle passenger compartment 202 along a door panel surface 210, as illustrated.

Various combinations of surfaces can be utilized in accordance with air duct outlets of the present invention for distributing air streams to remote locations. For example, door panels, windows, and headliner panels can be configured with various surface configurations to direct air flowing from an air duct outlet. Moreover, surfaces having various shapes (e.g., U-shapes, S-shapes, etc.) may be used to direct air streams to remote locations, in accordance with embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. An air duct outlet, comprising:
    a housing comprising a planar first wall and a convexly-curved second wall that are in adjacent, spaced-apart relationship and that define an air passageway having an inlet and a flared outlet; and
    a vane pivotally attached within the air passageway and movable between a first position wherein the vane is disposed in face-to-face adjacent relationship with the first wall and a range of positions that are increasingly transverse to the first wall, wherein an air stream flowing through the air passageway is deflected by an amount that increases with each position of the vane in the range such that the air stream adheres to a portion of the second wall by an amount that increases with each position of the vane in the range and such that the air stream exits from the outlet in a direction that is increasingly transverse to a direction normal to the outlet.

2. The air duct outlet of claim 1, wherein respective end portions of the first and second walls at the air passageway inlet are substantially parallel.

3. The air duct outlet of claim 1, wherein respective end portions of the first and second walls at the air passageway outlet are substantially orthogonal.

4. The air duct outlet of claim 1, further comprising an actuator extending from the housing and operably coupled with the vane to move the vane between positions in the range.

5. The air duct outlet of claim 1, further comprising: an actuator movably attached to the housing, wherein the actuator produces output signals responsive to user movement thereof; and
    a servomotor operably coupled with the vane, wherein the servomotor is configured to cause pivotal movement of the vane in response to selected user movement of the actuator.

6. The air duct outlet of claim 1, wherein movement of the vane between endpoints of the range causes a change in direction of an air stream exiting the outlet of between about 0° and about 90° relative to a direction normal to the outlet.

7. The air duct outlet of claim 1, wherein the vane is pivotally attached within the passageway adjacent the inlet.

8. The air duct outlet of claim 1, further comprising:
    a convexly-curved third wall that is in adjacent, spaced-apart relationship with the first wall, wherein the first and third walls define a second air passageway having an inlet and a flared outlet; and
    a second vane pivotally attached within the second air passageway and movable within a second range of positions that are increasingly transverse to the first wall, wherein an air stream flowing through the second air passageway is deflected by an amount that increases with each position of the second vane in the second range such that the air stream adheres to a portion of the third wall by an amount that increases with each position of the second vane in the second range and such that the air stream exits from the second air passageway outlet in a direction that is increasingly transverse to a direction normal to the second air passageway outlet.

9. The air duct outlet of claim 8, wherein respective end portions of the first and third walls at the second air passageway inlet are substantially parallel.

10. The air duct outlet of claim 8, wherein respective end portions of the first and third walls at the second air passageway outlet are substantially orthogonal.

11. The air duct outlet of claim 8, further comprising an actuator extending from the housing and operably coupled with the second vane to move the second vane between positions in the second range.

12. The air duct outlet of claim 8, further comprising:
    an actuator movably attached to the housing, wherein the actuator produces output signals responsive to user movement thereof; and
    a servomotor operably coupled with the second vane, wherein the servomotor is configured to cause pivotal movement of the second vane in response to selected user movement of the actuator.

13. The air duct outlet of claim 8, wherein movement of the second vane between endpoints of the second range causes a change in direction of an air stream exiting the second air passageway outlet of between about 0° and about 90° relative to a direction normal to the second air passageway outlet.

14. The air duct outlet of claim 8, wherein the second vane is pivotally attached within the second air passageway adjacent the second air passageway inlet.

15. An air duct outlet, comprising:
    a housing comprising first and second convexly-curved walls that are in adjacent, spaced-apart relationship and that define a first air passageway having an inlet and a flared outlet, a third convexly-curved wall that is in adjacent, spaced-apart relationship with the first wall, wherein the first and third walls define a second air passageway having an inlet and a flared outlet;
    a first vane pivotally attached within the first air passageway and movable within a range of positions that are increasingly transverse to the first wall, wherein an air stream flowing through the air passageway is deflected by an amount that increases with each increasingly transverse position of the vane in the range such that the air stream adheres to less of a portion of the first wall and more of a portion of the second wall with each increasingly transverse position of the vane in the range; and a second vane pivotally attached within the second passageway and movable within a range of positions that are increasingly transverse to the first wall, wherein an air stream flowing through the second air passageway is deflected by an amount that increases with each increasingly transverse position of the second vane in the range such that the air stream adheres to less of a portion of the first wall and more of a portion of the third wall with each increasingly transverse position of the second vane in the range.

16. The air duct outlet of claim 15, further comprising an actuator extending from the housing and operably coupled with the vane to move the vane between positions in the range.

17. The air duct outlet of claim 15, further comprising:
an actuator movably attached to the housing, wherein the actuator produces output signals responsive to user movement thereof; and
a servomotor operably coupled with the vane, wherein the servomotor is configured to cause pivotal movement of the vane in response to selected user movement of the actuator.

18. The air duct outlet of claim 15, further comprising an actuator extending from the housing and operably coupled with the second vane to move the second vane between positions in the range.

19. The air duct outlet of claim 15, further comprising:
an actuator movably attached to the housing, wherein the actuator produces output signals responsive to user movement thereof; and
a servomotor operably coupled with the second vane, wherein the servomotor is configured to cause pivotal movement of the second vane in response to selected user movement of the actuator.

20. An air distribution system for a vehicle passenger compartment, comprising:
an instrument panel comprising a convexly-curved portion and an opening formed therein in spaced-apart relationship with the opening; and
an air duct outlet disposed within the instrument panel opening, wherein the air duct outlet receives air from an air source and comprises:
a housing comprising a planar first wall and a convexly-curved second wall that are in adjacent, spaced-apart relationship and that define an air passageway having an inlet and a flared outlet; and
a vane pivotally attached within the air passageway, wherein the vane is movable between a first position in face-to-face relationship with the first wall and a second position substantially transverse to the first wall, wherein an air stream flowing through the air passageway exits from the outlet in a first direction substantially parallel with the first wall when the vane is in the first position, and wherein an air stream flowing through the air passageway is deflected by the vane when in the second position such that the air stream adheres to the second wall and, upon exiting from the outlet, adheres to the instrument panel surface and is directed towards the instrument panel convexly-curved portion, and wherein the air stream adheres to the convexly-curved portion of the instrument panel and is directed to a remote location of the vehicle passenger compartment.

21. The air distribution system of claim 20, wherein respective end portions of the first and second walls at the air passageway inlet are substantially parallel.

22. The air distribution system of claim 20, wherein respective end portions of the first and second walls at the air passageway outlet are substantially orthogonal.

23. The air distribution system of claim 20, further comprising an actuator extending from the housing and operably coupled with the vane to move the vane between the first and second positions.

24. The air distribution system of claim 20, further comprising:
an actuator movably attached to the housing, wherein the actuator produces output signals responsive to user movement thereof; and
a servomotor operably coupled with the vane, wherein the servomotor is configured to cause pivotal movement or the vane in response to selected user movement of the actuator.

25. The air distribution system of claim 20, wherein movement of the vane between the first and second positions causes a change in direction of an air stream exiting the outlet of between about 0° and about 90° relative to a direction normal to the outlet.

26. The air distribution system of claim 20, wherein the vane is pivotally attached within the passageway adjacent the inlet.

* * * * *

UNITED STATES PATENT AND TRADEMARK OFFICE
CERTIFICATE OF CORRECTION

PATENT NO. : 6,902,474 B2
DATED : June 7, 2005
INVENTOR(S) : Gehring et al.

It is certified that error appears in the above-identified patent and that said Letters Patent is hereby corrected as shown below:

Column 9,
Line 1, should read -- a second vane pivotally attached within the second air pas- --.

Signed and Sealed this

Twenty-ninth Day of November, 2005

JON W. DUDAS
*Director of the United States Patent and Trademark Office*